(12) United States Patent
Marks

(10) Patent No.: US 12,085,068 B2
(45) Date of Patent: Sep. 10, 2024

(54) AQUARIUM PERISTALTIC PUMP WITH ROTATION DETECTION ARRANGEMENT

(71) Applicant: RED SEA AQUATICS DEVELOPMENT LTD., Herzlia (IL)

(72) Inventor: Neil H. Marks, Ra'anana (IL)

(73) Assignee: RED SEA AQUATICS DEVELOPMENT LTD, Herzlia (IL)

( * ) Notice: Subject to any disclaimer, the term of this patent is extended or adjusted under 35 U.S.C. 154(b) by 0 days.

(21) Appl. No.: 18/022,447

(22) PCT Filed: Aug. 6, 2021

(86) PCT No.: PCT/IL2021/050958
§ 371 (c)(1),
(2) Date: Feb. 21, 2023

(87) PCT Pub. No.: WO2022/043986
PCT Pub. Date: Mar. 3, 2022

(65) Prior Publication Data
US 2023/0228263 A1    Jul. 20, 2023

(30) Foreign Application Priority Data

Aug. 23, 2020 (IL) .......................................... 276882
Feb. 18, 2021 (IL) .......................................... 280948

(51) Int. Cl.
*F04B 43/12* (2006.01)
*F04B 43/00* (2006.01)
(Continued)

(52) U.S. Cl.
CPC ...... *F04B 43/1253* (2013.01); *F04B 43/0081* (2013.01); *A01K 63/003* (2013.01); *F04B 53/22* (2013.01)

(58) Field of Classification Search
CPC . F04B 43/1253; F04B 43/0081; A01K 63/003
See application file for complete search history.

(56) References Cited

U.S. PATENT DOCUMENTS 4,913,703 A    4/1990  Pasqualucci et al.
5,542,826 A *  8/1996  Warner ................. F04B 43/082
                                                        417/474
(Continued)

FOREIGN PATENT DOCUMENTS

CN    202605422 U    12/2012
CN    208859415 U    5/2019
(Continued)

OTHER PUBLICATIONS

Agrowtek (https://agrowtek.com/doc/im/IM_ADi.pdf, file viewed via Waybackmachine with associated date of Dec. 8, 2017 (Year: 2017).*

(Continued)

*Primary Examiner* — Nathan C Zollinger
(74) *Attorney, Agent, or Firm* — Panitch Schwarze Belisario & Nadel LLP

(57) ABSTRACT

Peristaltic dosing pump including a pump housing, a dosing head, and a manual tool-less clamping arrangement for repeated detachable clamping of the dosing head on the pump housing. Reef aquarium LED array illumination units having a planar LED array for emitting illumination and a 3D stadium lens centrally mounted with respect thereto and underlying same for projecting a generally homogenous spectrum, diverging generally stadium shaped illumination beam.

6 Claims, 10 Drawing Sheets

(51) Int. Cl.
*F04B 53/22* (2006.01)
*A01K 63/00* (2017.01)

(56) References Cited

U.S. PATENT DOCUMENTS

| | | | |
|---|---|---|---|
| 8,152,498 B2 * | 4/2012 | Bunoz | F04B 43/1284 417/269 |
| 2003/0024860 A1 | 2/2003 | Fritze | |
| 2005/0069436 A1 * | 3/2005 | Shibasaki | A61M 60/37 417/474 |
| 2005/0267401 A1 | 12/2005 | Price et al. | |
| 2006/0102542 A1 | 5/2006 | Carley et al. | |
| 2008/0135725 A1 | 6/2008 | Bisch et al. | |
| 2008/0147008 A1 | 6/2008 | Lewis et al. | |
| 2010/0002435 A1 | 1/2010 | Rash | |
| 2012/0044713 A1 | 2/2012 | Chiang et al. | |
| 2012/0283630 A1 | 11/2012 | Lee et al. | |
| 2014/0135731 A1 | 5/2014 | Breitweiser et al. | |
| 2016/0257551 A1 | 9/2016 | Cohen et al. | |
| 2016/0346467 A1 | 12/2016 | Breitweiser et al. | |
| 2018/0221570 A1 * | 8/2018 | Morgan, III | F04B 43/1253 |
| 2021/0369940 A1 * | 12/2021 | Leclere | A61M 1/77 |

FOREIGN PATENT DOCUMENTS

| | | | |
|---|---|---|---|
| EP | 0 033 666 A1 | 8/1981 | |
| ES | 2388680 T3 * | 10/2012 | B67D 1/0054 |
| WO | WO-2021217704 A1 * | 11/2021 | |

OTHER PUBLICATIONS

Gikfun (https://www.amazon.com/Gikfun-Adjustable-Peristaltic-Metering-Analytical/dp/B08BX2CNSD, note date first available Jun. 26, 2020 (Year: 2020).*

English Machine translation of ES-2388680-T3 (Year: 2012).*

International Search Report and Written Opinion issued Jan. 28, 2022 in PCT/IL2021/050958.

* cited by examiner

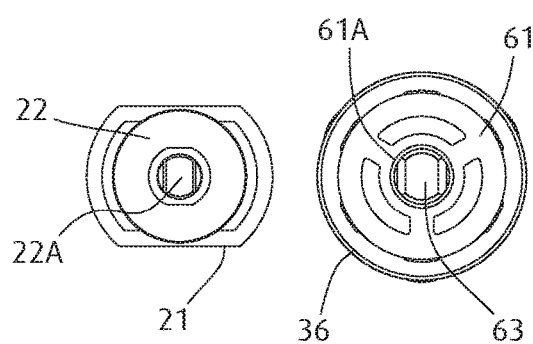 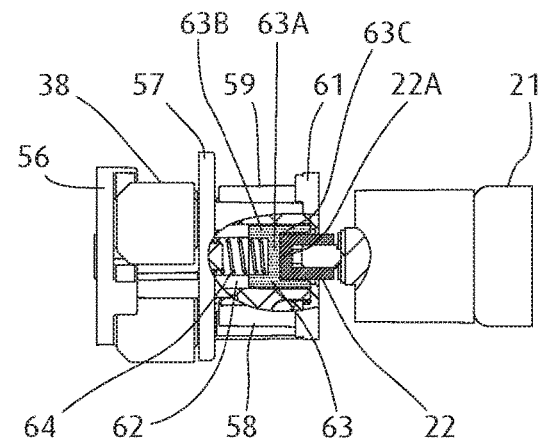
FIG.7A  FIG.7B
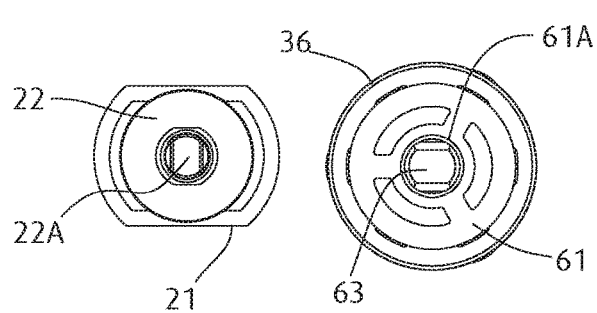 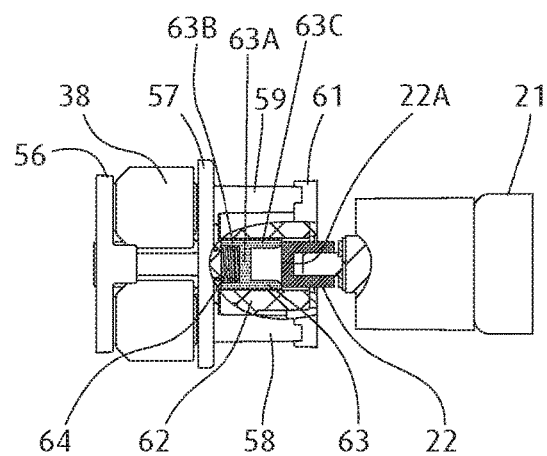
FIG.8A  FIG.8B

AQUARIUM PERISTALTIC PUMP WITH ROTATION DETECTION ARRANGEMENT

CROSS-REFERENCE TO RELATED APPLICATIONS

This application is a Section 371 of International Application No PCT/IL2021/050958, filed Aug. 6, 2021, which was published in the English language on Mar. 3, 2022, under International Publication No. WO 2022/043986 A1, which claims priority under 35 U.S.C. § 119(b) to Israeli Application No. 276882, filed Aug. 23, 2020 and Israeli Application No. 280948, filed Feb. 18, 2021, the disclosures of each of which are incorporated herein by reference.

FIELD OF THE INVENTION

The invention relates to improvements in aquarium equipment.

BACKGROUND OF THE INVENTION

Peristaltic dosing pumps are known for dispensing liquid from a liquid source to a liquid destination. Peristaltic dosing pumps include a motor having a drive shaft for rotating a rotor having two or more spaced apart rollers for cyclically pinching an elastomeric tube for administering a liquid drop between each roller pair. Motors run the gamut from low-cost friction drive motors to high-cost direct drive stepper motors depending on an application at hand. The former employ a time-based system for dispensing inaccurate volumes of liquid due to slippage between a motor and a rotor. The latter employ very precise stepwise rotational movements resulting in precise volumetric dispensing. Some non-stepper motor pumps include a rotation detection arrangement for monitoring a rotor's rotation. Suitable rotation detection arrangements include inter alia optical arrangements, Hall effect arrangements, and the like.

Exemplary peristaltic dosing pumps are described in inter alia CN 202605422, U.S. Pat. No. 4,913,703, U.S. 2005/0267401, U.S. 2008/0147008, U.S. 2012/0283630, U.S. 2014/0135731, and U.S. 2016/0257551. Peristaltic dosing pumps require periodic replacement of an elastomeric tube for long term accurate operation. Replacement of an elastomeric tube is typically a time consuming and inconvenient procedure. Some peristaltic dosing pumps require the use of tools for replacement of an elastomeric tube which further complicates replacement.

Reef aquariums preferably have corals positioned over their entire base and height-wise from their base up to their aquarium water surface. Reef aquariums typically have a square or rectangular shape in a top plan view with corals extending both lengthwise and widthwise. The range of accepted Photosynthetic Active Radiation (PAR) intensities to ensure optimal coral growth and wellbeing is a maximum PAR intensity of about 550 $\mu mol/m^2/sec$ and a minimum PAR intensity of about 100 $\mu mol/m^2/sec$. PAR intensities outside this range can significantly affect coral growth and wellbeing.

Recently available reef aquarium LED array illumination units have a planar LED array including a multitude of individual specific wave length LED chips that together create a total spectrum that is approximately the equivalent of between 9000 and 23000 Kelvin required for corals. Such planar LED arrays have a generally compact configuration in which the multiple LEDs are bound within a generally circular or square boundary.

Recently available reef aquarium LED array illumination units include a semi-spherical negative meniscus lens centrally mounted with respect to a planar LED array and underlying same for downwardly projecting a diverging conical illumination beam towards an aquarium water surface. A semi-spherical negative meniscus lens has a maximum PAR intensity directly under its planar LED array and ensures a generally homogenous spectrum throughout the diverging conical illumination beam.

Reef aquarium LED array illumination units are available at different LED array power ratings, for example, 50 W, 90 W and 160 W and are intended to be deployed at predetermined heights above an aquarium water surface to meet two PAR intensity criteria as follows: First, a PAR intensity within the aforesaid range over an entire aquarium water surface. And second, a minimum PAR intensity at an aquarium water base due to illumination absorption in an aquarium water column. These two PAR intensity criteria constrain the height of an aquarium water column.

There is a need for low-cost, high accuracy peristaltic dosing pumps enabling tool-less replacement of an elastomeric tube, and also reef aquarium LED array illumination units for affording higher aquarium water columns meeting the required two PAR intensity criteria.

SUMMARY OF THE INVENTION

The first aspect of the present invention is directed towards a peristaltic dosing pump including a pump housing, a dosing head, and a clamping arrangement for repeated detachable clamping of the dosing head on the pump housing. The clamping arrangement is preferably tool-less for user convenience, namely, no tools are required for clamping a dosing head on a pump housing and unclamping it therefrom. Suitable clamping arrangements include inter alia snap fit arrangements, bayonet arrangements, and the like. The pump housing includes a non-stepper motor with a drive shaft for non-friction direct driving of a rotor installed in the dosing head for cyclically pinching an elastomeric tube deployed therein for administering liquid drops. The peristaltic dosing pump includes a rotation detection arrangement for detecting rotation of its rotor. The peristaltic dosing pump includes a controller for setting operation of the motor and issuing an alert in the case that operation of the motor does not rotate the rotor. The dosing head is designed for convenient replacement of a worn elastomeric tube. The dosing head preferably includes a tube securing arrangement for securing a tube therein for avoiding slippage during operation. The rotor preferably includes a spring biased clutch arrangement such that the dosing head can be clamped on the pump housing without a user having to carefully pre-align a rotor with a drive shaft whereupon the drive shaft engages the rotor on operation of the motor. The peristaltic dosing pump is capable of administering liquid drops in the order of about 0.07 ml per liquid drop. The peristaltic dosing pump is capable of dispensing liquid at high accuracy suitable for a wide range of applications.

The second aspect of the present invention is directed towards reef aquarium LED array illumination units having a planar LED array for emitting illumination and a 3D stadium lens centrally mounted with respect thereto and underlying same for projecting a generally homogenous spectrum, diverging generally stadium shaped illumination beam. The term in "3D stadium lens" has been coined from a 2D geometrical shape "stadium" defined as a rectangle with semicircles at a pair of opposite sides. The rectangle's length between the opposite pair of semi-circles is typically longer than the rectangle's width which equals the semi-circles' diameter. The 3D stadium lenses can be formed as a solid lens or a negative meniscus lens.

In a similar manner to a semi-spherical lens, a 3D stadium lens also results in a maximum PAR intensity directly underlying its planar LED array. But on comparison of two reef aquarium LED array illumination units having the same planar LED array and deployed at the same height above a reef aquarium, a 3D stadium lens has a lower maximum PAR intensity directly under its planar LED array at the aquarium water surface than a semi-spherical lens. This is achieved by virtue of a 3D stadium lens more evenly dispersing illumination compared to a semi-spherical lens. Such more even dispersion means that a reef aquarium LED array illumination unit with a 3D stadium lens can be provided with a higher LED array power rating compared to a semi-spherical lens which in turn enables higher aquarium water columns meeting the required two PAR intensity criteria.

BRIEF DESCRIPTION OF THE DRAWINGS

In order to understand the present invention and to see how it can be carried out in practice, preferred embodiments will now be described, by way of non-limiting examples only, with reference to the accompanying drawings, in which similar parts are likewise numbered, and in which

FIG. 7A shows a front view of a rotor in alignment with a motor;

FIG. 7B is a cross section of the rotor along line A-A in FIG. 1 on mounting the rotor in alignment with the motor;

FIG. 8A shows a front view of a rotor in misalignment with a motor;

FIG. 8B is a cross section of the rotor along line A-A in FIG. 1 on mounting the rotor in misalignment with the motor;

DETAILED DESCRIPTION OF THE DRAWINGS

Peristaltic Pump Apparatus

Figure 1:
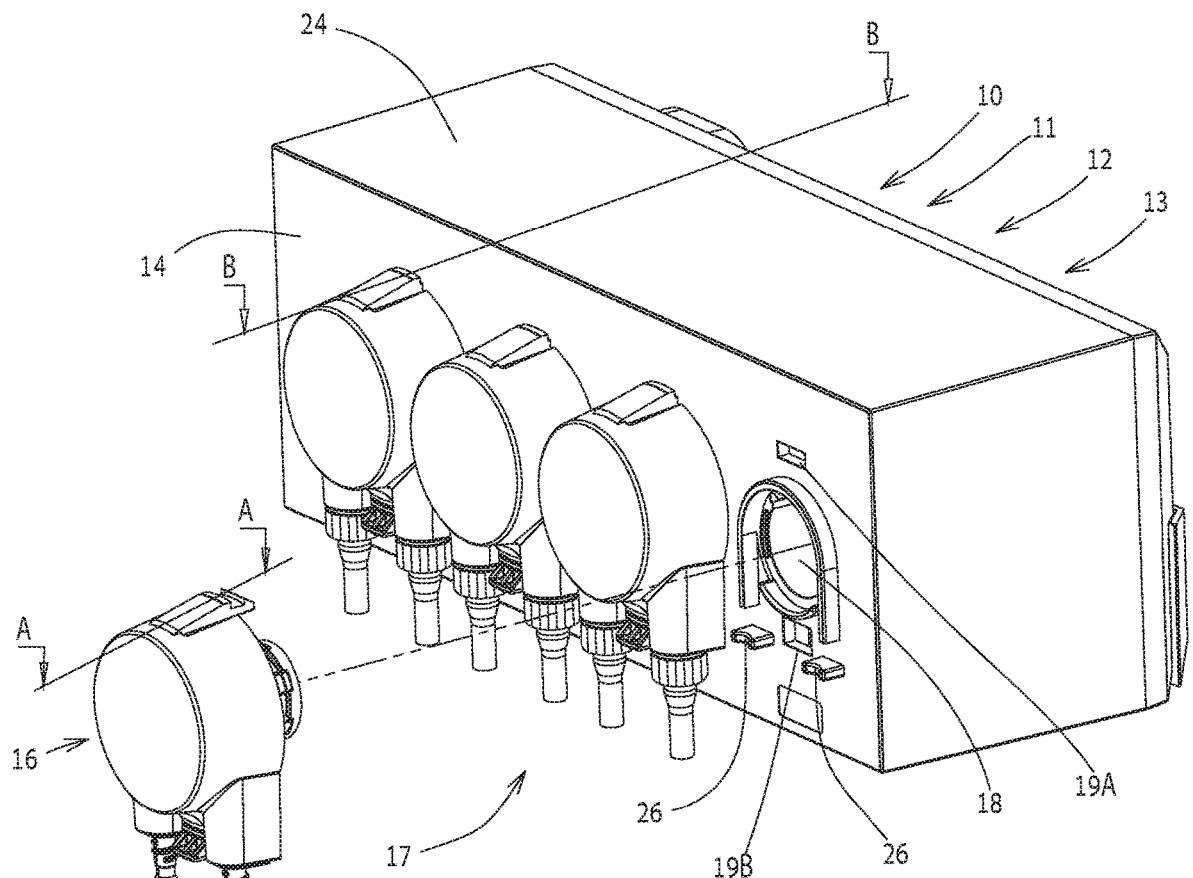
FIG. 1 is a front perspective view of peristaltic dosing apparatus of a widthwise sideways arrangement of four peristaltic dosing pumps and a dosing head detached from a rightmost peristaltic dosing pump.
Figure 2:
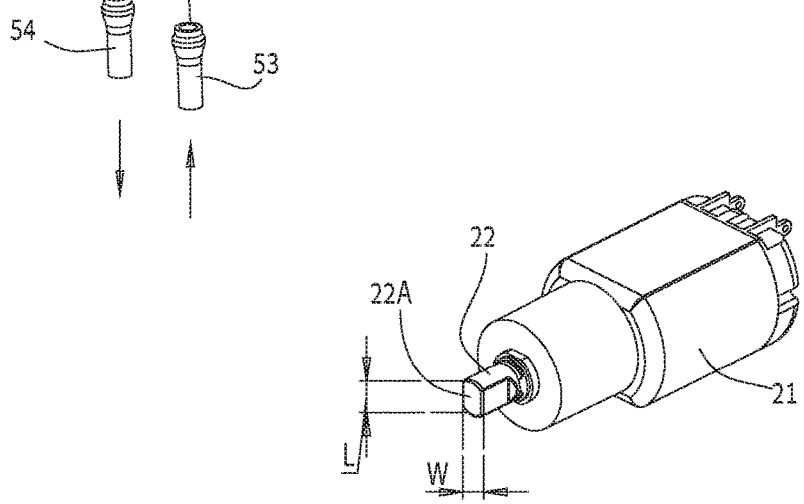
FIG. 2 is a front perspective view of a motor.
Figure 3:
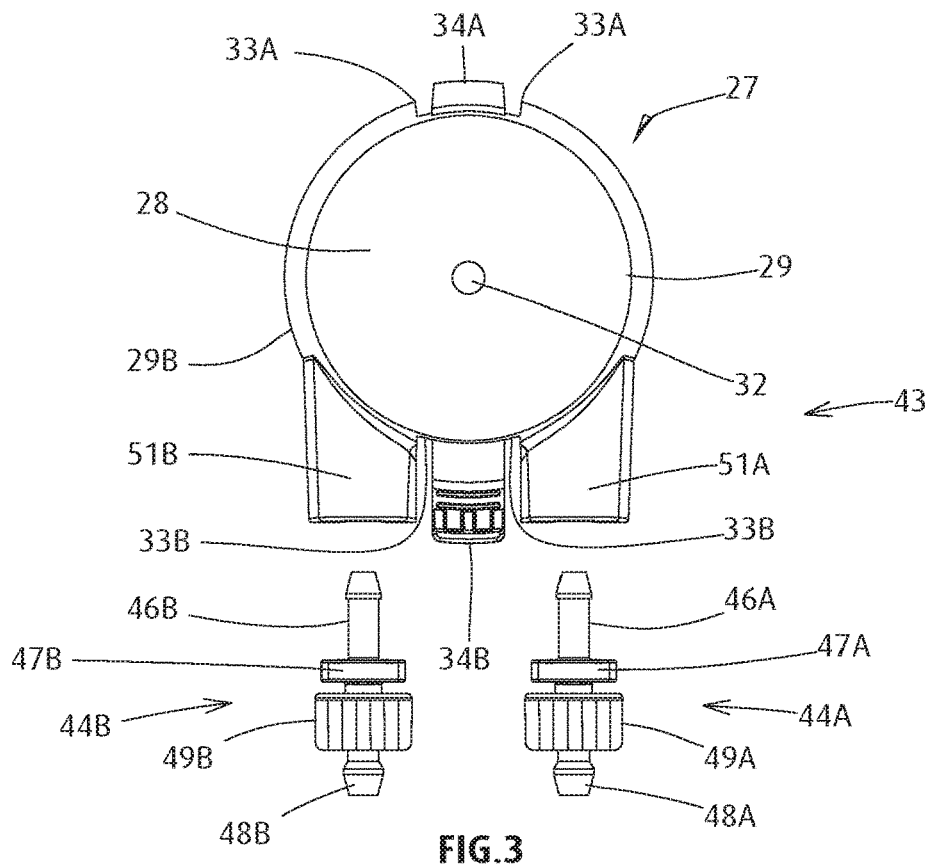
FIG. 3 is a front view of the dosing head.
Figure 4:
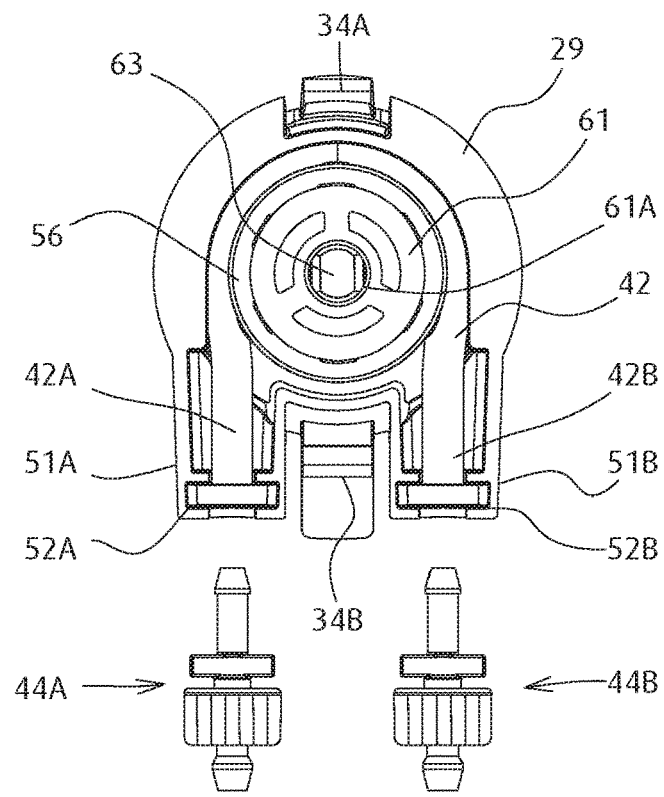
FIG. 4 is a rear view of the dosing head.
Figure 5:
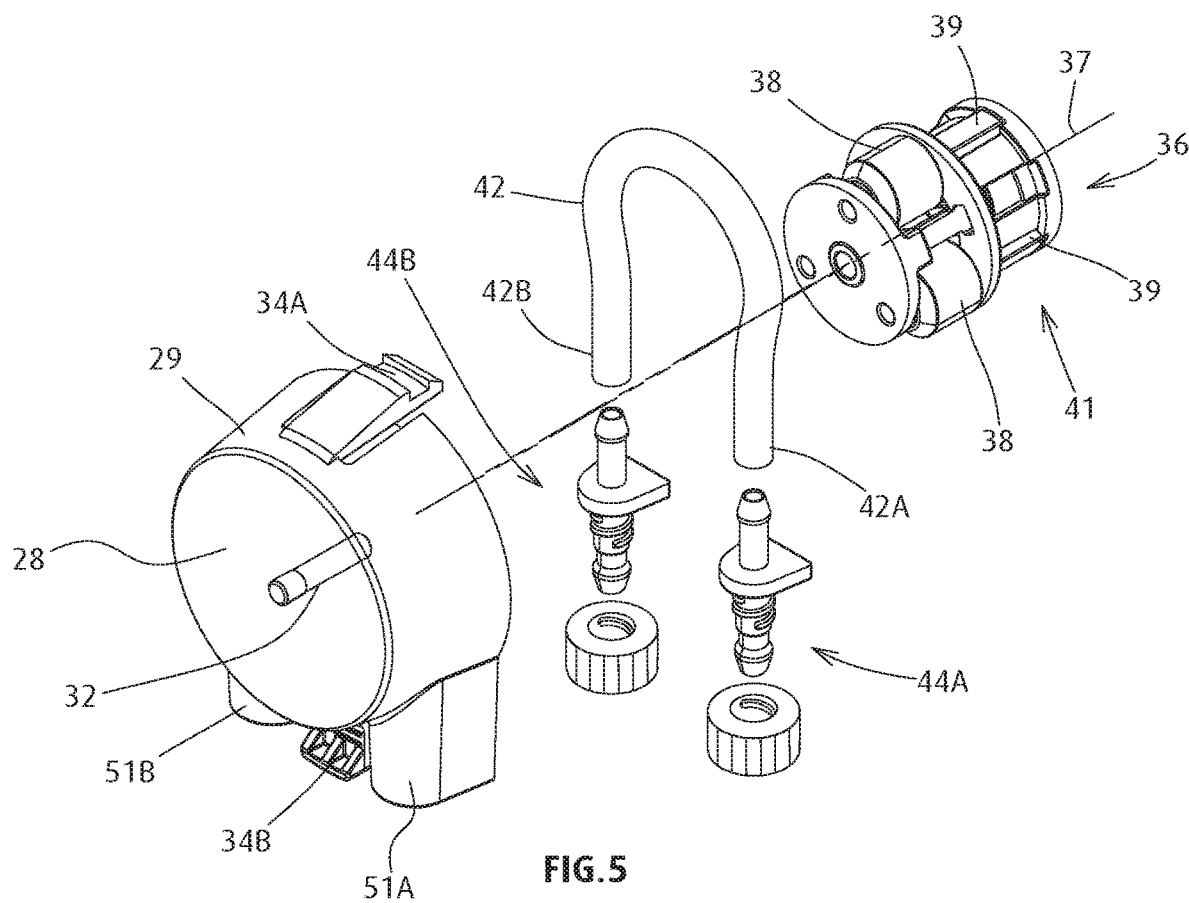
FIG. 5 is an exploded view of the dosing head.

FIG. 1 to FIG. 10 show peristaltic dosing apparatus 10 including a widthwise side-by-side arrangement of four peristaltic dosing pumps 11. The peristaltic dosing apparatus 10 is mains powered and includes a controller 12 for controlling operation of the peristaltic dosing pumps 11. The controller 12 can include a user interface and/or be remotely operated by a smartphone application. The peristaltic dosing pumps 11 are typically connected to different liquid sources each containing a different liquid and a single liquid destination. The liquids typically have different viscosities and other physical properties which requires calibration of the peristaltic dosing apparatus 10.

The peristaltic dosing pumps 11 have the same construction now described with respect to the rightmost peristaltic dosing pump. The peristaltic dosing pump 11 includes a pump housing 13 having a pump housing front face 14, a dosing head 16 and a manual clamping arrangement 17 for repeated snap fit clamping the dosing head 16 on the pump housing front face 14 and unclamping the dosing head 16 therefrom. The dosing head 16 is preferably flush against the pump housing front face 14 in its clamped position thereon. The pump housing front face 14 has a pump housing front face aperture 18 and a spaced apart pair of an upper clamping slot 19A above the pump housing front face aperture 18 and a lower clamping slot 19B below the pump housing front face aperture 18. The pump housing 13 includes a motor 21 including a drive shaft 22 accessible through the pump housing front face aperture 18. The drive shaft 22 has a leading double D shaped drive shaft head 22A having a major axis of length L and a minor axis of width W where L>W. The peristaltic dosing pump 11 includes a Hall sensor 23 adjacent the pump housing front face aperture 18. The Hall sensor 23 is in operative connection with the controller 12. The Hall sensor 23 is a component of a rotation detection arrangement 24. The pump housing front face 14 includes a pair of hose barb supports 26 on either side of the lower clamping slot 19B.

The dosing head 16 includes a generally cup-shaped dosing head body 27 having a dosing head body front face 28 and a dosing head body peripheral face 29 bounding a dosing head interior 31. The dosing head peripheral face 29 has an internal dosing head body peripheral face 29A and an external dosing head body peripheral face 29B. The dosing head body 27 includes a central spindle 32 rigidly mounted on the dosing head body front face 28 and extending inward into the dosing head interior 31.

The dosing head peripheral face 29 includes two spaced apart upper slots 33A for defining a resiliently flexible upper clamping member 34A for repeated snap fit removable insertion into the upper clamping slot 19A and two spaced apart lower slots 33B for defining a resiliently flexible lower clamping member 34B for repeated snap fit removable insertion into the lower clamping slot 19B. The upper clamping member 34A and the lower clamping member 34B are slightly inclined outward of the dosing head peripheral face 29 in their unflexed state.

The dosing head 16 includes a rotor 36 having a rotation axis 37 for rotatable mounting on the spindle 32. The rotor 36 can be manually repeatedly removed from and mounted on the spindle 32. The rotor 36 includes three equi-spaced rollers 38 disposed towards the dosing head body front face 28. The rotor 36 includes three magnets 39 correspondingly associated with the three rollers 38. The magnets 39 are components of the rotation detection arrangement 24. The rotor 36 includes a spring biased clutch arrangement 41 for enabling clamping the dosing head 16 on the pump housing 13 without accurate pre-alignment between the rotor 36 and the drive shaft 22 whereupon the drive shaft 22 engages the rotor 36 on operation of the motor 21.

The dosing head 16 includes an elastomeric tube 42 and a tube securing arrangement 43 for securing the tube 42 snugly deployed between the internal dosing head body peripheral face 29A and the rotor 36 to avoid slippage during operation. The tube 42 has a free tube inlet 42A and a free tube outlet 42B. The dosing head 16 includes a hose barb pair 44 each correspondingly having an upper hose barb end 46, a central hose barb flange 47, a lower hose barb end 48 and a hose barb screw 49. The tube securing arrangement 43 includes a downward depending hose barb mount pair 51 on either side of the lower clamping member 34B. The hose barb mount pair 51 each correspondingly has a widthwise groove 52 for sliding receiving a hose barb flange 47.

Set-up of the peristaltic dosing pump 11 includes the following steps: First, inserting the hose barb 44A's upper hose barb end 46A into the free tube inlet 42A, inserting the lower hose barb end 48A into an inlet tube 53 connected to a liquid source, using the hose barb screw 49A to secure the inlet tube 53 and slidingly inserting the central hose barb flange 47A into the hose barb mount's widthwise groove 52A. And second, inserting the hose barb 44B's upper hose barb end 46B into the free tube outlet 42B, inserting the lower hose barb end 48B into an outlet tube 54 connected to a liquid destination, using the hose barb screw 49B to secure the outlet tube 54 and slidingly inserting the central hose barb flange 47B into the hose barb mount's widthwise groove 52B. The hose barbs 44 abut against the hose barb supports 26 on snap fit clamping the dosing head 16 on the pump housing 13.

FIG. 7 to FIG. 8 show the construction and operation of the spring biased clutch arrangement 41. The rotor 36 includes a leading rotor section 56 towards the dosing head body front face 28, a central rotor plate 57, and a trailing rotor section 58 remote from the dosing head body front face 28. The leading rotor section 56 includes the three rollers 38. The trailing rotor section 58 includes a main trailing rotor section body 59 and a trailing rotor section clip 61 for rigidly clipping thereon. The trailing rotor section clip 61 has central circular aperture 61A having a diameter D slightly greater than the drive shaft head's length L such that the drive shaft head 22A can freely rotate therein. The main trailing rotor section body 59 includes a double D-shaped blind bore 62 having a double D-shaped rotor bushing 63 slidingly disposed between the central rotor plate 57 and the trailing rotor section clip 61.

The rotor bushing 63 has a central rotor bushing plate 63A, a leading rotor bushing blind bore 63B facing the central rotor plate 57 and a trailing rotor bushing blind bore 63C facing the trailing rotor section clip 61. The leading rotor bushing blind bore 63B accommodates a compression spring 64 having a non-compressed state for urging the rotor bushing 63 against the trailing rotor section clip 61. The trailing rotor bushing blind bore 63C has the same dimensions as the drive shaft head 22A for snugly accommodating the drive shaft head 22A therein on alignment therebetween for enabling the motor 21 to direct drive the rotor 36.

FIG. 7A and FIG. 7B show that on alignment of the rotor bushing 63 with the drive shaft head 22A, on snap fit mounting the dosing head 16 on the pump housing 13, the drive shaft head 22A immediately enters the trailing rotor bushing blind bore 63C via the trailing rotor section clip's central circular aperture 61A. Accordingly, the compression spring 64 remains in its initial non-compressed state for urging the rotor bushing 63 against the trailing rotor section clip 61. In contradistinction to FIG. 7A and FIG. 7B, FIG. 8A and FIG. 8B show that on misalignment between the rotor bushing 63 with the drive shaft head 22A, on snap fit mounting the dosing head 16 on the pump housing 13, the drive shaft head 22A acts against the rotor bushing 63 via the trailing rotor section clip's aperture 61A to slide the rotor bushing 63 towards the central rotor plate 57, thereby compressing the compression spring 64. On operation of the motor 21, the drive shaft head 22A rotates in the trailing rotor section clip's central circular aperture 61A until it aligns with the rotor bushing 63. On alignment, the compression spring 64 urges the rotor bushing 63 onto the drive shaft head 22A such that the trailing rotor bushing blind bore 63B accommodates the drive shaft head 22A in a similar manner to FIG. 7B.

The use of the peristaltic dosing apparatus 10 is as follows: A user connects the four peristatic dosing pumps to four liquid sources typically containing four different liquids for administration purposes. The four peristaltic dosing pumps typically administer liquid to the same liquid destination. A user preferably maintains the same connections during operation to avoid contamination issues and also due to calibration considerations because different liquids have different viscosities and other physical properties such that the four peristaltic dosing pumps typically administer liquid drops of different drop volumes per each ⅓ rotation of their motors.

Calibration of each peristaltic dosing pump involves determining a drop volume between consecutive rollers thereby enabling a user to set a peristatic dosing pump to administer either a predetermined number of liquid drops or a predetermined liquid volume. Calibration can include counting the number of complete rotations to deliver a predetermined liquid volume such that a drop volume between consecutive rollers can be calculated for each ⅓ motor rotation.

On operation of the peristaltic dosing pump, a user sets the four peristaltic dosing pumps to administer their liquids for either a predetermined number of liquid drops or a predetermined liquid volume in accordance with a predetermined administration schedule. Accordingly, the motors rotate their respective rotors for administering their respective liquids to the liquid destination. The magnets rotate past the Hall sensor for detecting such rotation.

In accordance with a maintenance schedule, the elastomeric tubes require replacement for continued correct operation. Replacement of an elastomeric tube in a dosing head is now described: The user grips the dosing head by its upper clamping member and the lower clamping member and urges them inwards towards one another for releasing the dosing head from the pump housing. The user detaches the dosing head from the pump housing. The user removes the rotor from the spindle and removes the hose barbs from the hose barb mounts. The user removes the elastomeric tube from the dosing head and disconnects the hose barbs from the elastomeric tube's free tube inlet and the free tube outlet.

The user attaches the hose barbs to a new elastomeric tube and inserts the new elastomeric tube in the dosing head and replaces the hose barbs in the hose barb mounts. The user replaces the rotor on the spindle and snap fit clamps the dosing head on the pump housing. In most instances, the rotor is misaligned with the drive shaft such that the spring biased rotor bushing is depressed on mounting the dosing head on the pump housing. On operation of the peristaltic dosing pump, the motor begins to rotate whereupon on exact alignment between the drive shaft head and the rotor bushing, the rotor bushing is urged onto the drive shaft head for direct drive by the motor.

In case the user does not correctly install the dosing head on the pump housing, on operation of the motor, the motor does not rotate the rotor and therefore the magnets do not rotate past the Hall sensor. Accordingly, the controller issues an alert.

Reef Aquarium LED Array Illumination Unit

FIG. 11 to FIG. 14 show a reef aquarium 100 having a general box shape and including a base surface 101, a front surface 102, a back surface 103, a left side surface 104 and a right side surface 106. The reef aquarium 100 has an aquarium length AL, an aquarium width AW and an aquarium height AH. The aquarium length AL is typically in the range from 50 cm to 200 cm. The aquarium width AW is typically in the range of 50 cm to 70 cm. The reef aquarium 100 has a length aspect ratio defined by the aquarium length AL with respect to the aquarium width AW. The reef aquarium 100 has an uppermost aquarium water surface WS and an aquarium water column WC. The aquarium water column WC is typically in the range of 50 cm to 70 cm.

FIG. 11 to FIG. 14 also show a reef aquarium LED array illumination unit 110 mounted midway along the back surface 13 for overhanging the reef aquarium 100 for downwardly projecting a generally homogenous spectrum, diverging generally stadium shaped illumination beam 111 for illuminating the aquarium water surface WS. The reef aquarium LED array illumination unit 110 is typically mounted in the range of about 300 mm to 320 mm above the aquarium water surface WS. The reef aquarium LED array illumination unit 120 is connected to a power supply 112 for powering same. The reef aquarium LED array illumination unit 110 includes a controller 113 for controlling same. The controller 113 can be manual operated or remotely operated from a portable device, for example, a smartphone application, a computer dashboard, a smart speaker, and the like. The reef aquarium LED array illumination unit 110 includes a cooling arrangement 114 for cooling purposes. The diverging generally 3D stadium shaped illumination beam 111 illuminates the entire aquarium water surface WS and leads to illumination spillage 116, namely, incident illumination beyond the reef aquarium 100.

Figure 15:
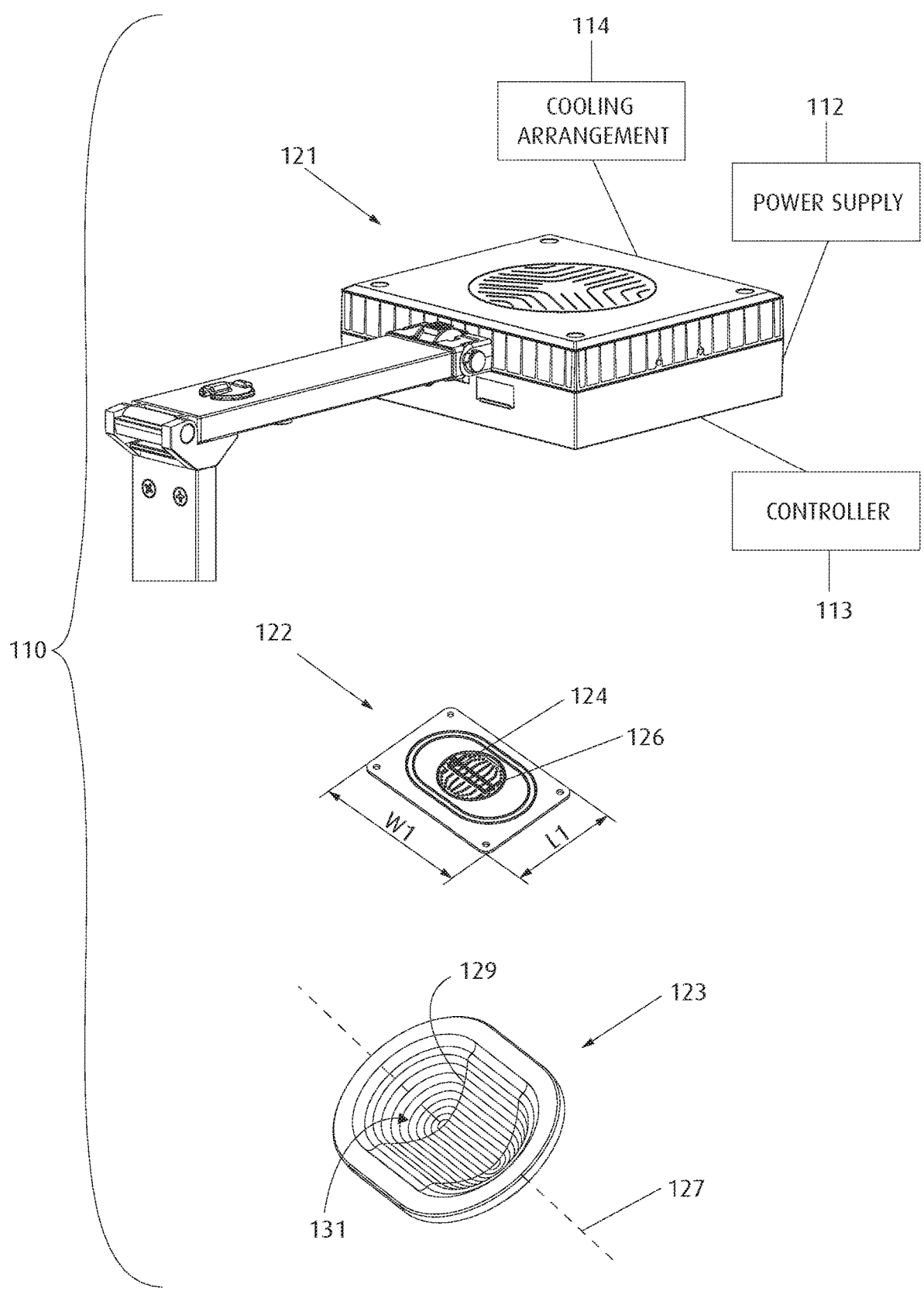
FIG. 15 is an exploded view of a reef aquarium LED array illumination unit including a base unit, a LED array and a 3D stadium lens.

FIG. 15 shows the reef aquarium LED array illumination unit 110 includes a base unit 121, a planar LED array 122 and a 3D stadium lens 123. The base unit 121 is connected to the power supply 112 and includes the controller 113 and the cooling arrangement 114. The LED array 122 has a LED array length L1 and a LED array width W1. The LED array 122 is preferably a compact LED array including multiple LEDs 124 within a generally circular or square boundary 126 such that W1 substantially equals L1. The LED array 122 includes a 23,000 Kelvin blue channel, a 8,000 Kelvin white channel and a separate dedicated moonlight channel to provide low levels of illumination. The LED array 122 can be provided with different power ratings, for example, 50 W, 60 W, etc. The 3D stadium lens 123 is transparent to the emitted illumination. The 3D stadium lens 33 can be made of plastic, glass, etc.

Figure 16:
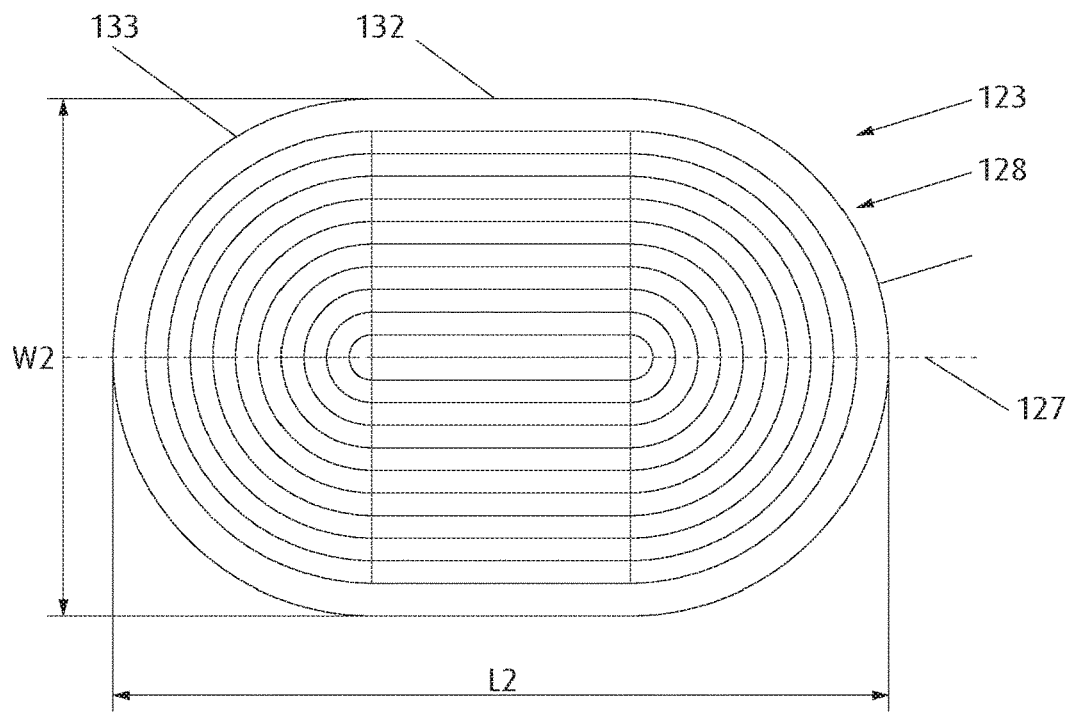
FIG. 16 is a top plan view of the 3D stadium lens.
Figure 17:
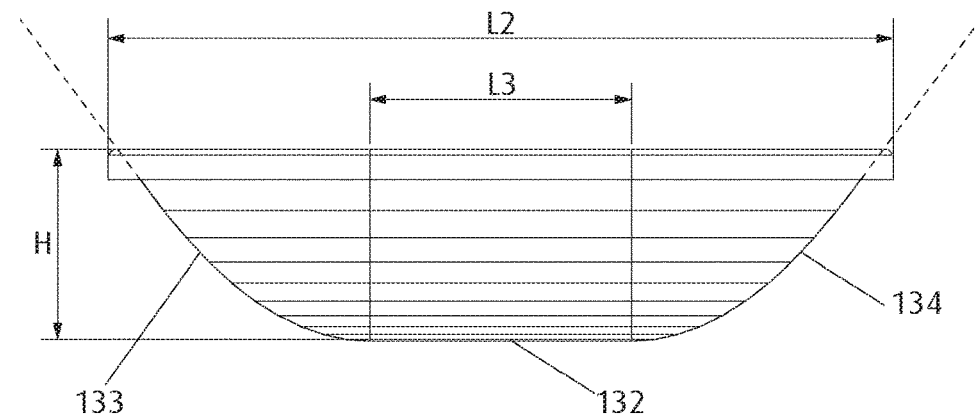
FIG. 17 is a front elevation view of the 3D stadium lens.
Figure 18:
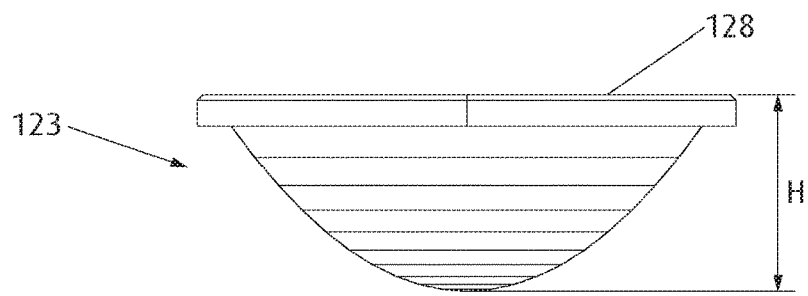
FIG. 18 is a side elevation view of the 3D stadium lens.

FIG. 16 to FIG. 18 show the 3D stadium lens 123 has a longitudinal centerline 127, a stadium shaped base plane 128, and a negative meniscus lens 129 bounding a hollow interior 131. The 3D stadium lens 123 has a 3D stadium lens length L2 co-directional with the longitudinal centerline 127 and a 3D stadium lens width W2 transverse thereto. The 3D stadium lens 123 includes a central portion 132 and an opposite pair of identical lateral portions 133 and 134.

Figure 6:
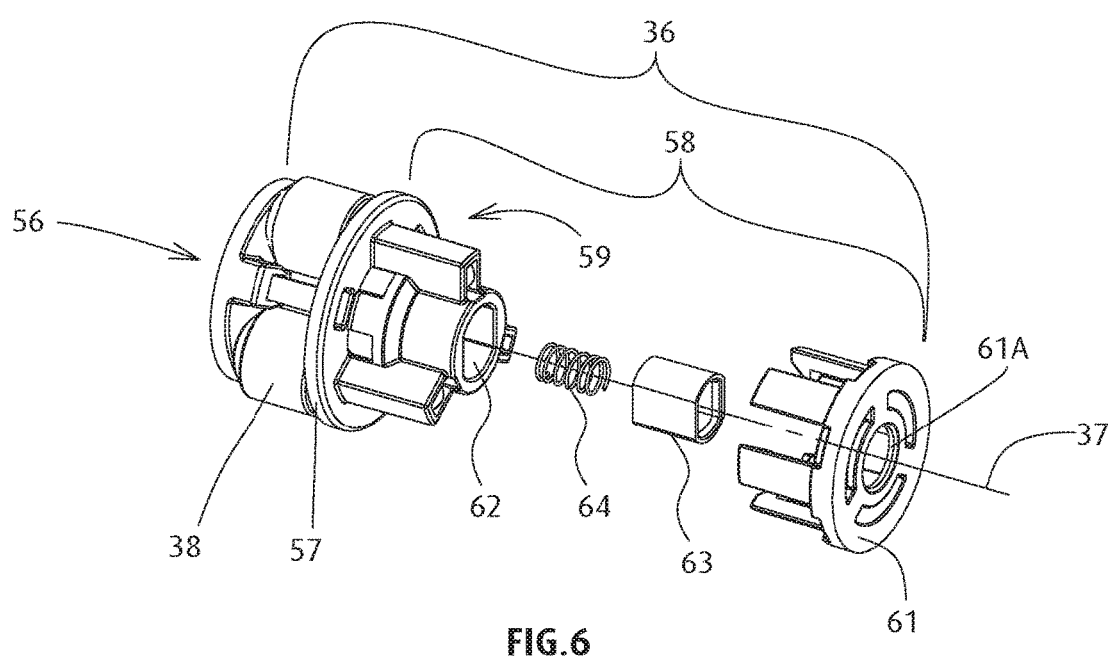
FIG. 6 is a partial exploded view of a rotor having a spring biased clutch arrangement.
Figure 9:
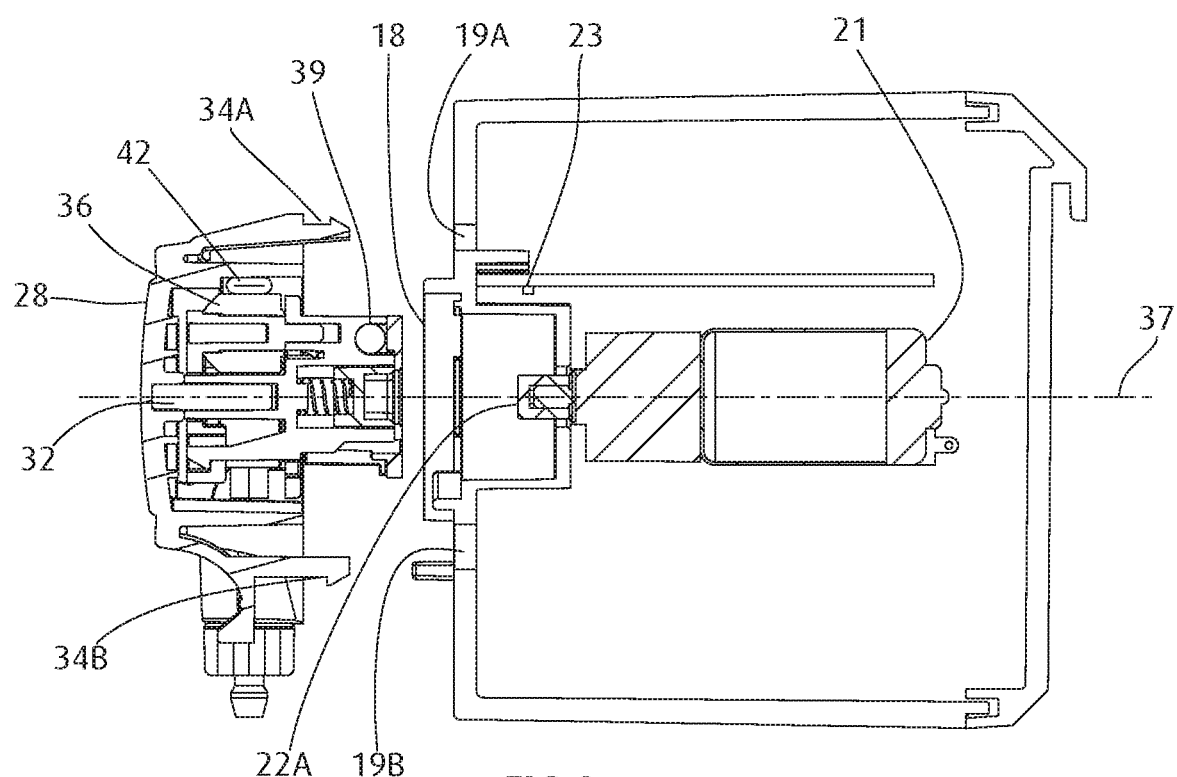
FIG. 9 is a cross section of a peristaltic dosing pump along line B-B in FIG. 1 before installation of a dosing head.
Figure 10:
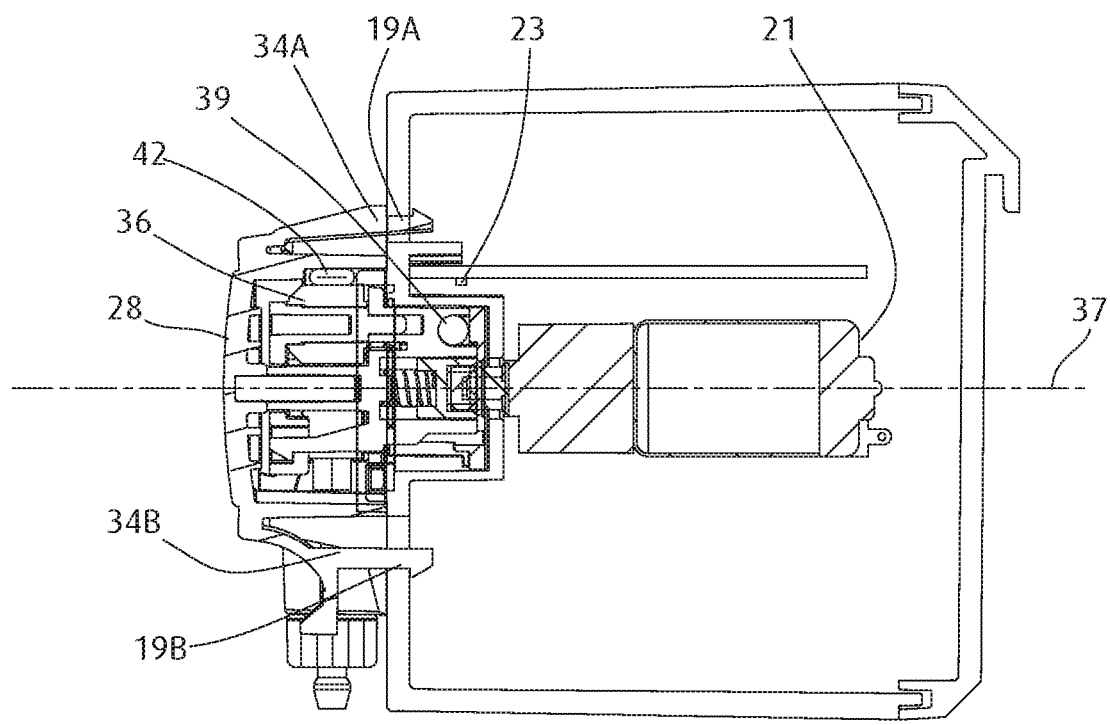
FIG. 10 is a cross section of a peristaltic dosing pump along line B-B in FIG. 1 after installation of a dosing head.
Figure 11:
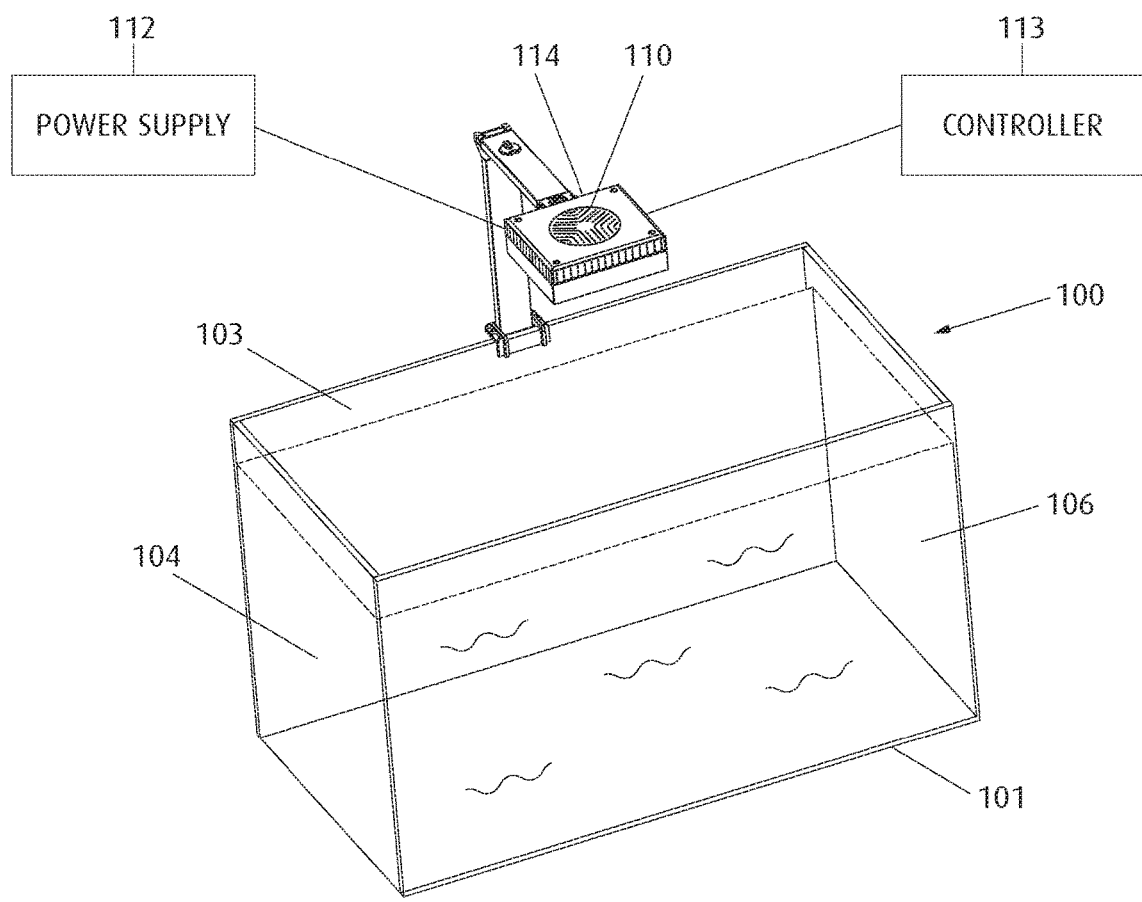
FIG. 11 is a combined block diagram and front perspective view of a reef aquarium and a reef aquarium LED array illumination unit.
Figure 12:
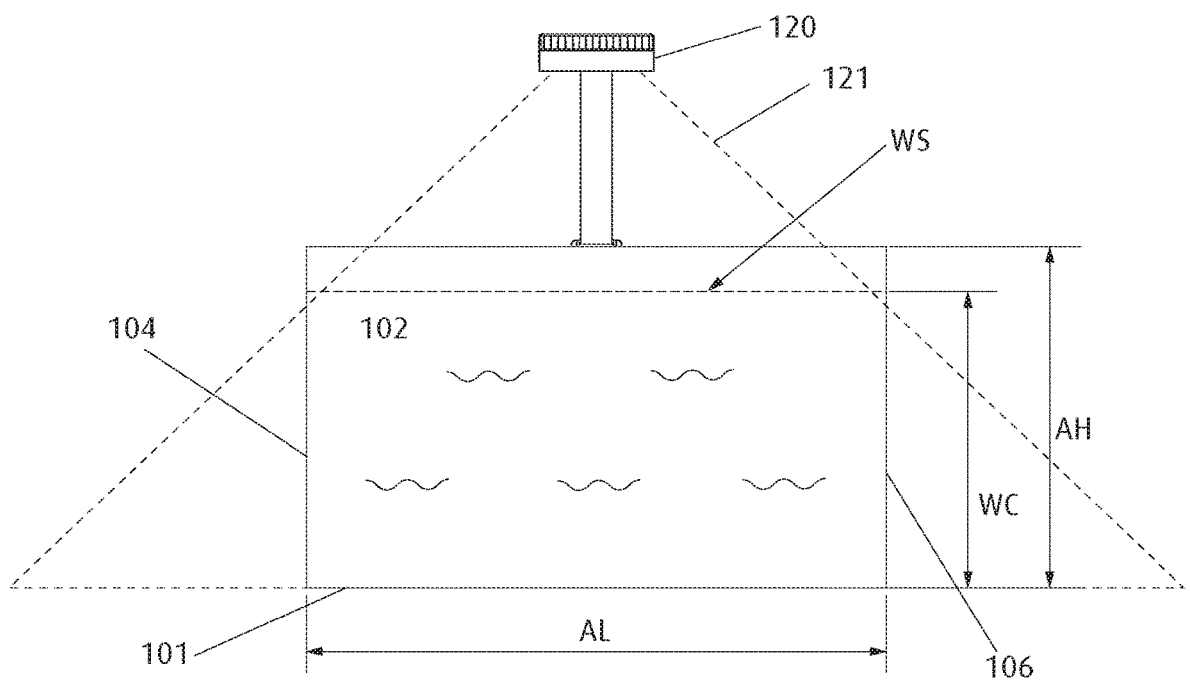
FIG. 12 is a front elevation view of the reef aquarium and the reef aquarium LED array illumination unit.
Figure 13:
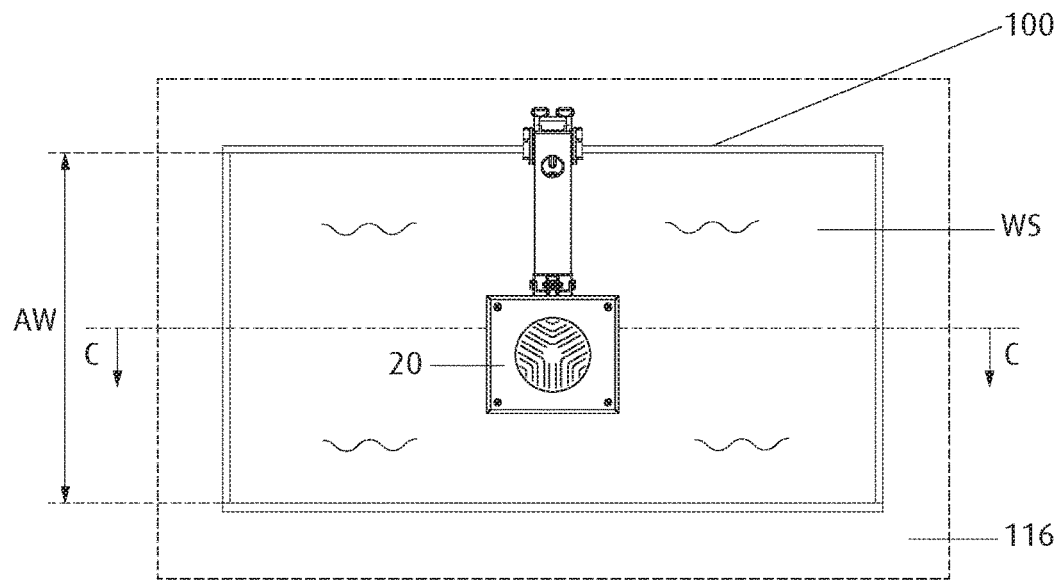
FIG. 13 is a top plan view of the reef aquarium and the reef aquarium LED array illumination unit.
Figure 14:
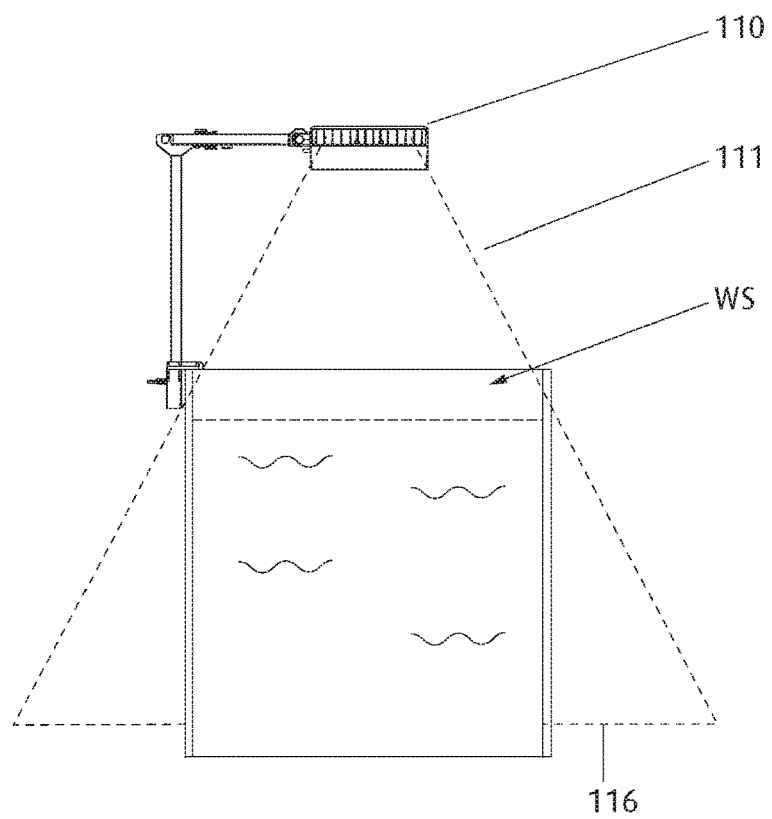
FIG. 14 is a side elevation view of the reef aquarium and the reef aquarium LED array illumination unit.

FIG. 16 shows the central portion 132 has a rectangular plan view with a length L3 along the longitudinal centerline 127 and the width W2 transverse thereto. The 3D stadium lens 123 has a length aspect ratio defined as the 3D stadium lens length L2 relative to the 3D stadium lens width W2 of about 1.5±0.1. FIG. 6 shows the opposite pair of identical lateral portions 133 and 134 each have a semi-circle plan view. The lateral portions 133 and 134 have a diameter D equal to the width W2. Accordingly, L2=L3+W2.

FIG. 17 shows the 3D stadium lens 123 has a 3D stadium lens height H perpendicular to the stadium shaped base plane 128. The 3D stadium lens 123 has a height aspect ratio defined as the 3D stadium lens height relative to the 3D stadium lens width of about 0.3±0.05.

Figure 19B:
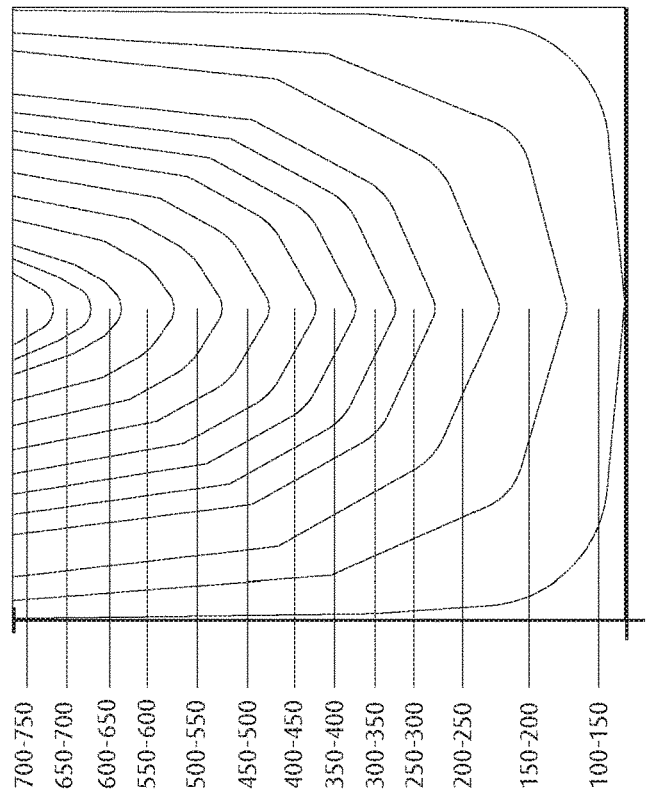
FIG. 19B is a PAR intensity graph of FIG. 11's reef aquarium along line C-C in FIG. 13 being illuminated by a reef aquarium LED array illumination unit with a conventional semi-spherical negative meniscus lens.
Figure 19A:
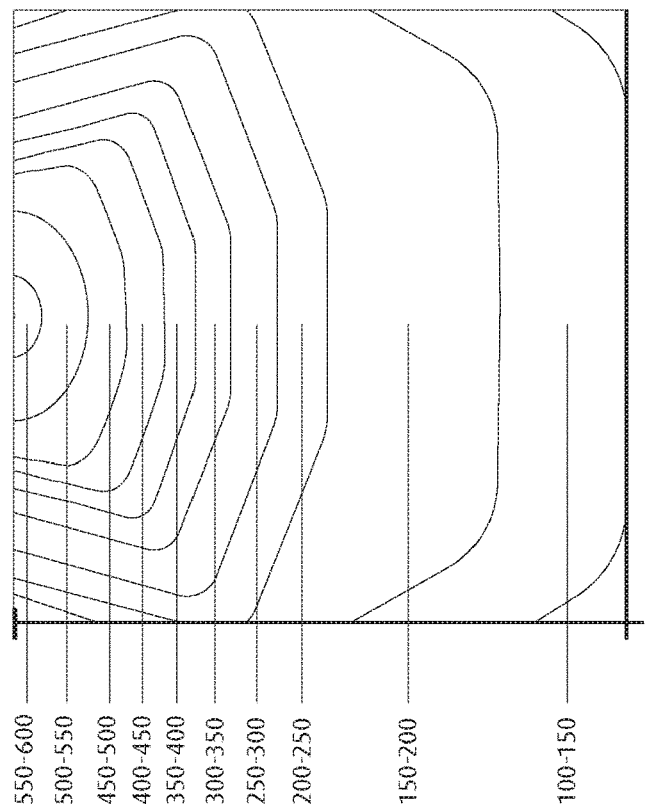
FIG. 19A is a PAR intensity graph of FIG. 11's reef aquarium along line C-C in FIG. 13.

FIG. 19A shows that a reef aquarium LED array illumination unit 110 with a 160 W power rating mounted 300 mm above the reef aquarium 100's aquarium water surface affords a 550-600 µmol/m²/sec maximum PAR intensity directly thereunder and a 100-150 µmol/m²/sec minimum PAR intensity at the aquarium water base both within the accepted PAR intensity range. In contradistinction, FIG. 19B shows that the same reef aquarium LED array illumination unit 110 with the same 160 W power rating at the same deployment but having a semi-spherical lens instead of a 3D stadium lens would lead to an acceptable 100-150 µmol/m²/sec minimum PAR intensity at the aquarium water base but an unacceptably high 700-750 µmol/m²/sec maximum PAR intensity at the aquarium water surface directly thereunder. Comparison of the two PAR intensity graphs also shows the 3D stadium lens more evenly disperses illumination compared to the semi-spherical lens.

A reef aquarium LED array illumination unit having a semi-spherical lens at the same deployment on the reef aquarium 100 would have to a lower power rating than 160 W in order to illuminate an aquarium water surface at an acceptable maximum PAR intensity but this in turn would lead to an unacceptably low minimum PAR intensity at the aquarium water base. In the case of a reef aquarium LED array illumination unit with a semi-spherical lens for illuminating a reef aquarium's water surface and water base within the accepted PAR intensity range, an aquarium water column would have to be made less high compared to the reef aquarium 100's water column height.

While the invention has been described with respect to a limited number of embodiments, it will be appreciated that many variations, modifications, and other applications of the invention can be made within the scope of the appended claims.

The invention claimed is:
1. A peristaltic dosing pump comprising:
(a) a pump housing including:
   i) a pump housing front face including a pump housing front face aperture,
   ii) a motor including a drive shaft accessible through said pump housing front face aperture,
   iii) a controller for setting operation of said motor and issuing alerts; and iv) a Hall sensor positioned within said pump housing located towards said pump housing front face adjacent said pump housing front face aperture, (b) a dosing head including:

i) a generally cup-shaped dosing head body having a dosing head body front face and a dosing head body peripheral surface, said dosing head peripheral surface having an internal dosing head body peripheral surface and an external dosing head body peripheral surface, ii) a rotor having at least two rollers and being rotatably mounted in said dosing head body and repeatedly removably mounted therein, said rotor being capable of being repeatedly mounted on said drive shaft for non-friction direct drive thereby, said rotor includes a trailing rotor section remote from said dosing head body front face, and said trailing rotor section includes at least one magnet, and iii) an elastomeric tube having a free tube inlet and a free tube outlet, said elastomeric tube being mounted between said at least two rollers and said internal dosing head body peripheral surface whereby said at least two rollers rotatably impinge on said elastomeric tube on rotation of said rotor for driving liquid from said free tube inlet to said free tube outlet;

(c) a manual tool-less clamping arrangement for repeated clamping said dosing head on said pump housing front face and unclamping said dosing head therefrom, thereby correspondingly mounting said rotor on said drive shaft and demounting said rotor therefrom;

whereupon mounting said dosing head on said pump housing deploys said at least one magnet adjacent said Hall sensor; and (d) a rotation detection arrangement including said Hall sensor and said at least one magnet for detecting direct drive rotation of said rotor, the arrangement being such that i) said elastomeric tube being replaceable in said dosing head on detachment of said dosing head from said pump housing and removal of said rotor from said dosing head body, and ii) on operation of said motor, in the case of a correct installation of said dosing head on said pump housing front face, said motor direct drives said rotor for driving liquid from said free tube inlet to said free tube outlet or, in the case of an incorrect installation of said dosing head on said pump housing, said motor does not direct drive said rotor such that said rotation detection arrangement does not detect rotation of said rotor while said motor continues to rotate whereupon said controller issues an alert.

2. The pump according to claim 1 wherein said dosing head further comprises:

a first hose barb for connecting said free tube inlet to an inlet tube connected to a liquid source, a second hose barb for connecting said free tube outlet to an outlet tube connected to a liquid destination, and a tube securing arrangement including a hose barb mount pair for repeated detachable securing said first hose barb and said second hose barb therein thereby avoiding slippage of said tube during operation of the peristaltic dosing pump.

3. The pump according to claim 1 wherein said rotor includes a spring biased clutch arrangement for enabling clamping said dosing head on said pump housing without pre-alignment of said rotor with said drive shaft whereupon said drive shaft engages said rotor on operation of said motor.

4. The pump according to claim 1 wherein said clamping arrangement is constituted by at least two clamping slots deployed around said pump housing front face aperture, and said dosing head includes a corresponding number of clamping members for removable insertion into said at least two clamping slots.

5. The pump according to claim 1 wherein said rotor includes a magnet associated with each roller of said at least two rollers.

6. Peristaltic dosing apparatus including a widthwise side-by-side arrangement of at least two peristaltic dosing pumps according to claim 1.

* * * * *